Figure 1:
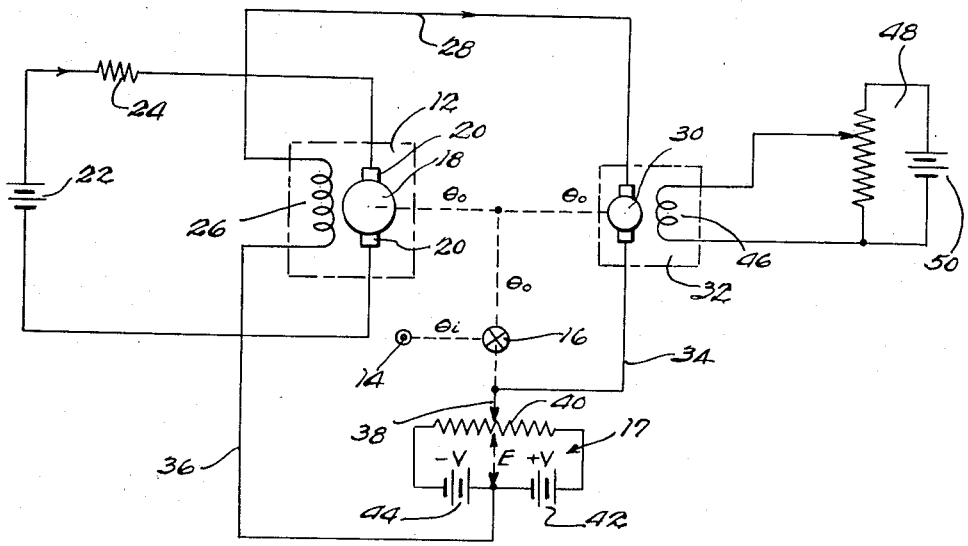

Jan. 13, 1959

D. C. McDONALD 2,869,059

FOLLOW-UP CONTROL SYSTEMS

Filed Dec. 13, 1954

INVENTOR.
Donald C. McDonald.
BY
Thiess, Olson, Mecklenburg,
von Holst, & Coltman.
Attys

United States Patent Office 2,869,059
Patented Jan. 13, 1959

2,869,059

FOLLOW-UP CONTROL SYSTEMS

Donald C. McDonald, Mount Prospect, Ill., assignor, by mesne assignments, to Cook Electric Company, Chicago, Ill., a corporation of Delaware Application December 13, 1954, Serial No. 474,649

14 Claims. (Cl. 318—32)

This application relates to improved follow-up control systems and more particularly to an improved system for producing closed cycle control wherein a feedback signal corresponding to the relative position of an input member or controller and an output member or load is applied to the field winding of an electric motor.

The term "control system" is herein applied to all devices in which the energy level at which the load operates is substantially above the input energy level to the controller. Closed cycle control systems generally perform the function of moving a large mass through a large capacity motive means by the application of a small force to a controller in accordance with the relative position of the load and controller. Typically, a feedback system indicates the relative position of the load and the controller at all times and generates a signal related to the difference in the positions of these two elements. This signal is hereinafter referred to as an error signal. Heretofore the error signal, which is generally a low power signal, has been amplified or used as a control means whereby a corresponding signal capable of supplying substantial power was applied to the armature of a drive motor for positioning the load. Such amplifiers or controls have generally employed vacuum tubes, transistors, magnetic amplifiers or rotary amplifiers. Such devices are expensive and unreliable, being subject to destruction or damage under adverse conditions of impact, vibration, and the like. Furthermore, because of the gain in the feedback circuit and the inertia of the system, the output would overshoot the point of positional correspondence with the input. To avoid this, anticipatory circuits were included in the feedback loop which removed the driving energy from the motive means at a time calculated to effect positional agreement when the load drifted to rest. Such systems provide inaccurate and slow response to changes in input position, falling far short of optimum response while requiring extensive amplifying and controlling equipment.

It is therefore one important object of this invention to provide a simplified servomechanism or follow-up system in which power amplification is inherent in the servo motor and controller.

It is a further object of this invention to provide an improved servomechanism requiring no vacuum tube amplifiers or the like and capable of producing optimum accuracy and speed of response.

It is another object of this invention to provide an improved servomechanism having inherent amplification in the driving motor and controller whereby external amplifiers and the like are not required.

It is still another object of this invention to provide an output damping factor in the control function of a servo motor without the use of amplifiers and the like.

It is still another object of this invention to provide an improved servo system in which a signal related to error and a signal related to output velocity are applied seriatim to the field winding of an output motor.

It is a further object of this invention to provide improved servo systems wherein the output of a tachometer generator driven coincidently with the load is applied seriatim with an error sensing device to the field winding of a servo motor.

Further and additional objects of this invention will become manifest from a consideration of this specification, the accompanying drawings and the appended claims.

By this invention a greatly improved feedback system is provided wherein inherent power amplification of a D. C. motor is utilized. A D. C. motor produces a torque according to the following equation:

(1) $$T_m = k_1 I_f I_a$$

wherein $T_m$ is the torque of the servo or follow-up motor, $k_1$ is a constant determined by the geometry of the system, $I_f$ is the field current which is proportional to field flux, and $I_a$ is the armature current. As armature current is always large compared to the field current and therefore the energy which must be supplied to the armature is large compared to the energy used in the field winding, a change in the field current will produce a relatively small change in the power dissipation in the entire system while greatly altering the torque output of the motor. Thus, by using the field winding for control purposes, inherent amplification is realized.

Also, by this invention, a unique manner of producing output damping is provided. If a signal is applied to the servo motor which is related only to the error, the system will be substantially underdamped and will therefore overshoot the zero error position, thus hunting continually over a predetermined error value in the region of positional agreement. While in such an underdamped system, speed of response will be a maximum, accuracy and stability will be reduced. One simple expedient for overcoming this overshoot and inaccuracy is to generate a signal which opposes the motion of the load and which is proportional to the output velocity. By applying the error signal and the damping signal to the field winding seriatim, improved accuracy and stability are realized with only a small sacrifice in speed of response. This teaching is applicable to both contactor, or discontinuous, and linear, or continuous, follow-up operation. In contactor type servomechanisms no corrective power is applied to the servo motor until a predetermined error exists and when such an error exists the full torque of the motor is utilized to eliminate the error. Such contactor systems are especially prone to overshoot because of the on-off, full torque mode of operation. In a continuous or linear type of servomechanism the error signal is at all times proportional to the error and such a system inherently shows a characteristic of reduced overshoot and better static accuracy. If the ratio of error signal to output velocity signal in a linear system or the ratio of maximum allowable error to damping voltage in a contactor system are properly selected, the system will be critically damped whereby the load will assume positional agreement relative to the controller in a minimum time with no overshoot or hunting.

By this invention a tachometer generator is placed in series with the control voltage and the difference therebetween is applied to the field winding of the driving motor. The term "difference," as used herein, will be understood to include difference voltages when the signals are of opposite polarity or, in effect, a sum of the two voltages. Thus effective power amplification of the output of the tachometer generator as well as amplification of the error signal is produced in the field winding of the servo motor.

In one form of this invention a servo motor is connected mechanically to drive a load such as a gun turret. An input such as a hand wheel is provided to indicate the desired position of the load and a mechanical differential is connected to the load and hand wheel to produce a positional output proportional to the difference between hand wheel and load positions. A potentiometer is driven directly from the differential to generate a voltage which is proportional to the differential signal; a tachometer generator is driven by the load, the output of which is placed in series with the potentiometer output to produce damping when applied to the field winding of the drive motor.

Figure 2:
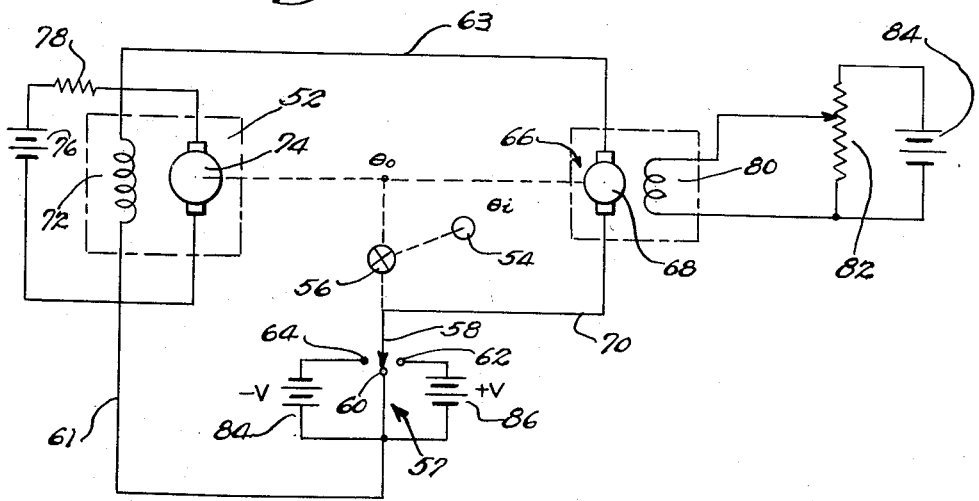

For a more complete understanding of this invention reference will now be made to the accompanying drawings wherein:

Fig. 1 is a schematic diagram of one embodiment of this invention utilizing continuous or linear control; and Fig. 2 illustrates schematically a second embodiment of this invention utilizing contactor or on-off control.

All of the various elements and circuitry in the two illustrated embodiments are shown in somewhat diagrammatic form to better illustrate and exemplify the principles involved. It will be understood, for example, that gears may be employed between any of the elements to alter the relative speeds thereof as may be desired.

Referring now to the drawings and more particularly to Fig. 1 a servo system 10 is illustrated having a driving motor 12, an input hand wheel 14, a differential device 16 to produce a mechanical output proportional to the positional difference between the motor 12 and hand wheel 14, and a potentiometer 17 driven by differential 16 providing a feedback loop to apply a signal proportional to the differential output or error to the servo motor 12. The servo motor 12 includes an armature winding 18 energized in a conventional manner through brushes 20 from a battery 22 or other equivalent source of D. C. voltage. A series resistor 24 is connected between battery 22 and armature 18 to limit the current flowing in the series circuit when the armature is in a stalled condition. While this resistance places a limit on the maximum velocity attainable by the motor 12, it is considered highly important in a system using a control system for energizing the field with a variable signal.

The motor 12 has a field winding 26 which is energized from the potentiometer 17 with a voltage having a magnitude and polarity determined by the error indications of differential 16. The field circuit of servo motor 12 may be traced from field winding 26 through conductor 28, armature winding 30 of tachometer generator 32, conductor 34, potentiometer 17 and conductor 36 to the opposite terminal of field winding 26. The wiper 38 of potentiometer 17 engages various points along an associated resistance element 40 in a conventional manner to automatically apply portions of the positive voltage source 42 or the negative voltage source 44 to the field winding 26 depending upon the magnitude of error. Thus, the voltage E which is the output voltage of potentiometer 17 is determined by the magnitude of voltage sources 42 and 44 and by the position of potentiometer wiper 38 relative to the zero or center position on resistor 40. As the voltages are of fixed predetermined values, the voltage E becomes a direct function of the error $e$. It is believed clear that the direction and speed of rotation of a D. C. motor is governed by the polarity and magnitude of the field excitation so that the motor 12 will be driven by the output of potentiometer 17 until the wiper 38 assumes the zero voltage position, the degree of field excitation depending upon the error and providing accelerating torque according to Equation 1.

To reduce the speed at which the motor comes to the zero error position and consequently prevent overshoot, the tachometer generator 32 is mechanically driven from the motor 12 whereby a signal is generated in the armature 30 which opposes the motion of motor 12. As described above this voltage is applied in series with the output of potentiometer 17 and if a positive step function of error is inserted by rotation of hand wheel 14 the following sequence of operation will occur. The potentiometer wiper 38 will be repositioned by differential 16 to apply a negative voltage to field winding 26 causing motor 12 to be energized in a negative direction to eliminate the error. As the motor and mechanically coupled generator gain speed the output of generator 32 will be positive and oppose the negative signal from potentiometer 17, thus reducing the speed of motor 12. As the error is eliminated the output of potentiometer 17 will be reduced and consequently the excitation of motor 12 is reduced, the speed of the motor is reduced, and the tachometer generator output is reduced. This will cause the motor to drive the output to positional agreement with a minimum of error and overshoot. The field winding 46 of tachometer generator 32 is energized from a potentiometer 48 including a source of voltage 50. The voltage output of tachometer generator 32 is proportional to the velocity thereof and the tachometer field current $i_f$, the voltage generally following the equation:

$$V_t = k_3 \dot{\theta}_o i_f \quad (2)$$

and as field current, $i_f$, remains constant:

$$V_t = k_4 \dot{\theta}_o \quad (3)$$

where $V_t$ is the voltage output of tachometer 32, $k_4$ is a constant determined by the construction of the generator, $\dot{\theta}_o$ is the output velocity, and $i_f$ is the tachometer field current.

The current in motor armature 18 will follow the equation:

$$I_a = \frac{V_s - E_g}{R_a} \quad (4)$$

where $V_s$ is the voltage of armature source 22, $E_g$ is the back E. M. F. in the armature winding, and $R_a$ is the total resistance in the armature circuit including the external resistance 24.

The current in field winding 26 will follow the equation:

$$I_f = \frac{E - V_t}{R_f} \quad (5)$$

where E is the error voltage, $V_t$ is the output voltage of generator 32, and $R_f$ is the total resistance of the field circuit. Substituting the righthand function of Equation 3 for $V_t$, this equation becomes:

$$I_f = \frac{E - k_4 \dot{\theta}_o}{R_f} \quad (6)$$

The torque output of the entire system, utilizing the torque Equation 1 and substituting for $I_f$ the function shown in Equation 6 and substituting for $I_a$ the function of Equation 4 will follow the equation:

$$T_m = \frac{k_1}{R_f R_a}(E - k_4 \dot{\theta})(V_s - E_g) \quad (7)$$

The first factor of Equation 7 is a constant, the second is proportional to the error less the output damping factor, and the third factor is the difference between the line voltage applied to motor 12 and the back E. M. F. generated in its armature. The second term is the desired control term and determines the response and degree of damping, while the third term establishes an upper limit on the useful torque or maximum speed of the motor.

A second embodiment of this invention is illustrated diagrammatically in Fig. 2. This construction uses the principles described above and includes a servomotor 52, a hand wheel input 54 and a mechanically coupled differential 56. The output of differential 56 operates a simple controller 57 including a switch and two voltage sources. The switch mechanism 58 has at least three positions; the center position in engagement with contact 60 indicates positional agreement of the output, while positive and negative errors will shift the switch contact 58 to complete circuits through the right and left hand contacts 62 and 64 respectively. A tachometer generator 66 is mechanically driven by motor 52 and the armature 68 thereof is connected in series with the switch 58 through conductor 70. Tachometer generator 66 and switch 58 are connected in series to the field winding 72 of motor 52 through conductors 61 and 63.

The armature 74 of motor 52 is energized by battery 76 through resistor 78. The field winding 80 of tachometer generator 66 is energized through a potentiometer 82 from an independent voltage source 84. If the differential output indicates a positive error greater than the limit of accuracy for the system, switch 58 engages contact 64 applying a negative voltage source 84 to the field winding 72, thus driving the load toward positional agreement. If, however, the differential indicates a negative error, wiper 58 engages contact 62 applying the voltage of positive voltage source 86 to the field winding 72, also driving the load toward positional agreement. As described previously, the voltage sources 84 and 86 are selected to produce a maximum torque of the system to correct in a minimum time any errors which exist. The output of tachometer generator 66 opposes the motion of motor 52 and will generally oppose the voltage of the source 84 or 86. While the tachometer generator will reduce the speed of response of the system, it will greatly improve the accuracy and reduce the hunting or overshoot.

By providing the center contact 60, additional stability is produced in the system not heretofore obtainable. As positional agreement is approached wiper 58 engages center contact 60 removing the control voltage from the field winding 72. However, as the controller is then shorted out through contact 60, the output of tachometer 66 is directly applied to the field winding 72 and will oppose the motion of motor 52 bringing said motor to rest in a minimum time. A further advantage is provided by the center contact 60 in that while the system is at rest, if, because of wind effects or mechanical disturbances, the output is moved from its rest position, a signal is generated in the tachometer 66 opposing such motion.

While tachometer generators have heretofore been employed for output damping purposes in servomechanisms, great advantages are realized in this invention by the direct application of a tachometer generator output in the field winding of a servomotor in combination with a source of error voltage. As pointed out above such a technique produces several important advantages over the prior art. Conventionally, the tachometer is merely used to anticipate the arrival of the output at a position of agreement, thus opening the control switches at a predetermined time in advance of the time within which positional agreement is reached, the time interval being determined by the speed of the output of the motor. Such a technique is not output damping but is merely anticipatory switching. Such a system lacks many of the damping characteristics herein described. For example, this system provides damping in the center zone of permissible error to reduce drift and overshoot.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A position control system comprising an output motor means having an armature winding and an independently energizable field means, controlling means capable of assuming a plurality of related contiguous positions, means for sensing the instantaneous relative positions of said motor means and said controlling means to provide voltages seriatim in said field means in accordance with said instantaneous relative positions, and means for providing limited current to said armature winding.

2. A position control system comprising an output motor means having an armature winding and an independently energizable field means, controlling means capable of assuming a plurality of related contiguous positions, means for sensing the instantaneous relative positions of said motor means and said controlling means to provide voltages seriatim in said field means in accordance with said instantaneous relative positions, said voltages being polarized to energize said motor to produce substantial positional agreement between said motor and said controlling means, and means for providing limited current to said armature winding.

3. A position control system comprising an output motor means having an armature winding and an independently energizable field means, controlling means capable of assuming a plurality of related contiguous positions, means for sensing the instantaneous relative positions of said motor means and said controlling means to provide voltages in said field means bearing a proportional relationship to said instantaneous relative positions, said voltages being polarized to energize said motor to produce substantial positional agreement between said motor and said controlling means, and means for providing limited current to said armature winding in accordance with the speed of said motor means.

4. A position control system comprising an output motor means having an armature winding and an independently energizable field means, controlling means capable of assuming a plurality of related contiguous positions, means for sensing the instantaneous relative positions of said motor means and said controlling means to apply voltage source means having a predetermined voltage to said field means in accordance with said instantaneous relative positions and to by-pass said voltage source means when said motor and said controlling means are in positional agreement, said voltage being polarized to energize said motor to produce such positional agreement, and means for providing limited current to said armature winding in accordance with the speed of said motor means.

5. In a position control system including an output motor means having an armature winding and an independently energizable field means, and a controlling means capable of assuming a plurality of related contiguous positions, actuating means comprising means for sensing the instantaneous relative positions of said motor means and said controlling means to provide control voltages in accordance therewith, and means to provide damping voltages in accordance with the speed of said motor means, the voltages of said latter two means being applied seriatim to the field means of said motor means.

6. In a position control system including an output motor means having an armature winding and an independently energizable field means, and a controlling means capable of assuming a plurality of related contiguous positions, operating means comprising means for sensing the instantaneous relative positions of said motor means and said controlling means to provide control voltages in accordance therewith, and means to provide damping voltages in accordance with the speed of said motor means, the voltages of said latter two means being applied seriatim to the field means of said motor means, said control voltages being polarized to produce substantial positional agreement between said motor means and said controlling means, and said damping voltages being polarized to oppose the motion of said motor means.

7. In a position control system including an output motor means having an armature winding and an independently energizable field means, and a controlling means capable of assuming a plurality of related contiguous positions, actuating means comprising means for sensing the instantaneous relative positions of said motor means and said controlling means to provide control voltages in accordance therewith, and means to provide damping voltages in accordance with the speed of said motor means, the voltages of said latter two means being applied seriatim to the field means of said motor means, said control voltages being polarized to produce substantial positional agreement between said motor means and said controlling means, and said damping voltages bearing a proportionate relationship to the speed of said motor means and being polarized to oppose the motion of said motor means.

8. In a position control system including an output motor means having an armature winding and an independently energizable field means and a controlling means capable of assuming a plurality of related contiguous positions, actuating means comprising means for sensing the instantaneous relative positions of said motor means and said controlling means, voltage means actuated by said sensing means to produce control voltages in accordance with the indication thereof, tachometer generator means to generate damping voltages bearing a proportional relationship to the speed of said motor means, and circuit means utilizing said control voltages and said damping voltages to energize said field means in accordance with the sum thereof.

9. In a position control system including an output motor means having an armature winding and an independently energizable field means and a controlling means capable of assumig a plurality of related contiguous positions, actuating means comprising means for sensing the instantaneous relative positions of said motor means and said controlling means, voltage means actuated by said sensing means to produce control voltages in accordance with the indication thereof, tachometer generator means to generate damping voltages bearing a proportional relationship to the speed of said motor means, circuit means utilizing said control voltages and said damping voltages to energize said field means in accordance with the sum thereof, and means for providing limited current to said armature winding.

10. In a position control system including an output motor means having an armature winding and an independently energizable field means and a controlling means capable of assuming a plurality of related contiguous positions, actuating means comprising means for sensing the instantaneous relative positions of said motor means and said controlling means, voltage means actuated by said sensing means to produce control voltages in accordance with the indication thereof, tachometer generator means having an armature winding and field means to generate damping voltages bearing a proportionate relationship to the speed of said motor means, means to energize said generator field means with a predetermined voltage, circuit means utilizing said control voltages and said damping voltages to energize said motor field means in accordance with the sum thereof, and means for providing limited current to said armature winding.

11. In a position control system including an output motor means having an armature winding and an independently energizable field means and a controlling means capable of assuming a plurality of related contiguous positions, actuating means comprising means for sensing the instantaneous relative positions of said motor means and said controlling means, means actuated by said sensing means to produce control voltages bearing a proportional relationship to the indications thereof, tachometer generator means to generate damping voltages bearing a proportional relationship to the speed of said motor means, and circuit means utilizing said control voltages and said damping voltages to energize said field means in accordance with the sum thereof.

12. In a position control system including an output motor means having an armature winding and an independently energizable field means and a controlling means capable of assuming a plurality of related contiguous positions, actuating means comprising means for sensing the instantaneous relative positions of said motor means and said controlling means, means actuated by said sensing means to produce fixed voltages having a polarity corresponding to the polarity of the motor means position relative to the controlling means position, and providing an electrical by-pass when said motor means and said controlling means are in substantial positional agreement, tachometer generator means to generate damping voltages bearing a proportional relationship to the speed of said motor means, and circuit means utilizing said control voltages and said damping voltages to energize said field means in accordance with the sum thereof.

13. In a position control system including an output motor means having an armature winding and an independently energizable field means and a controlling means capable of assuming a plurality of related contiguous positions, actuating means comprising means for sensing the instantaneous relative positions of said motor means and said controlling means, means actuated by said sensing means to produce control voltages bearing a proportional relationship to the indications thereof, tachometer generator means to generate damping voltages bearing a proportional relationship to the speed of said motor means, and circuit means connecting said motor field means, said tachometer generator means and said voltage means seriatim.

14. In a position control system including an output motor means having an armature winding and an independently energizable field means and a controlling means capable of assuming a plurality of related contiguous positions, actuating means comprising means for sensing the instantaneous relative positions of said motor means and said controlling means, means actuated by said sensing means to produce fixed voltages having a polarity corresponding to the polarity of the motor means position relative to the controlling means position, and providing an electrical by-pass when said motor means and said controlling means are in substantial positional agreement, tachometer generator means to generate damping voltages bearing a proportional relationship to the speed of said motor means, and circuit means connecting said motor field means, said tachometer generator means and said voltage means seriatim.

References Cited in the file of this patent

UNITED STATES PATENTS

| | | |
|---|---|---|
| 2,115,086 | Riggs | Apr. 26, 1938 |
| 2,508,082 | Wald | May 16, 1950 |
| 2,762,002 | Umpleby | Sept. 4, 1956 |
| 2,766,412 | Stephenson | Oct. 9, 1956 |
| 2,766,413 | Young | Oct. 9, 1956 |